United States Patent [19]

Harden et al.

[11] Patent Number: 4,519,461
[45] Date of Patent: May 28, 1985

[54] TWO-WAY PLOW WITH OFFSET TRIPS

[75] Inventors: Eldon A. Harden, Naperville; Kent B. Randol, Oswego, both of Ill.

[73] Assignee: J. I. Case Company, Racine, Wis.

[21] Appl. No.: 420,448

[22] Filed: Sep. 20, 1982

[51] Int. Cl.³ .................. A01B 3/42; A01B 61/04
[52] U.S. Cl. ...................... 172/225; 172/266
[58] Field of Search ............ 172/204, 224, 225, 260.5, 172/261, 264, 265, 266, 267, 268, 269, 270, 271

[56] References Cited

U.S. PATENT DOCUMENTS

| 2,913,059 | 11/1959 | Toland et al. | 172/224 |
| 3,662,839 | 5/1972 | Thorsrud et al. | 172/266 |
| 3,662,840 | 5/1972 | Richey | 172/224 |
| 3,910,354 | 10/1975 | Johnson et al. | 172/267 |
| 3,985,187 | 10/1976 | Callahan | 172/224 |
| 4,236,583 | 12/1980 | Geurts | 172/266 |
| 4,312,407 | 1/1982 | Crosby | 172/261 |

FOREIGN PATENT DOCUMENTS

| S 7223 | 4/1956 | Fed. Rep. of Germany | 172/224 |
| 1036052 | 4/1953 | France | 172/271 |
| 1138538 | 1/1957 | France | 172/271 |
| Ad. 94307 | 6/1969 | France | 172/261 |
| 454388 | 1/1950 | Italy | 172/224 |
| 1371324 | 10/1974 | United Kingdom | 172/225 |

Primary Examiner—Richard T. Stouffer
Attorney, Agent, or Firm—Dressler, Goldsmith, Shore, Sutker & Milnamow, Ltd.

[57] ABSTRACT

A plow that has a plurality of equally spaced right hand plows and left hand plows that are mounted one above the other on a beam of the plow support structure. Each right hand plow has trip linkage that is offset from the trip linkage of the left hand plow of the set. The plow structure is mounted on a frame for 180° rotation on an axis offset from the longitudinal center line of the frame so that the foremost right hand plow in the working position is the same distance from the longitudinal center line of the frame as the left hand plow in the working position.

4 Claims, 6 Drawing Figures

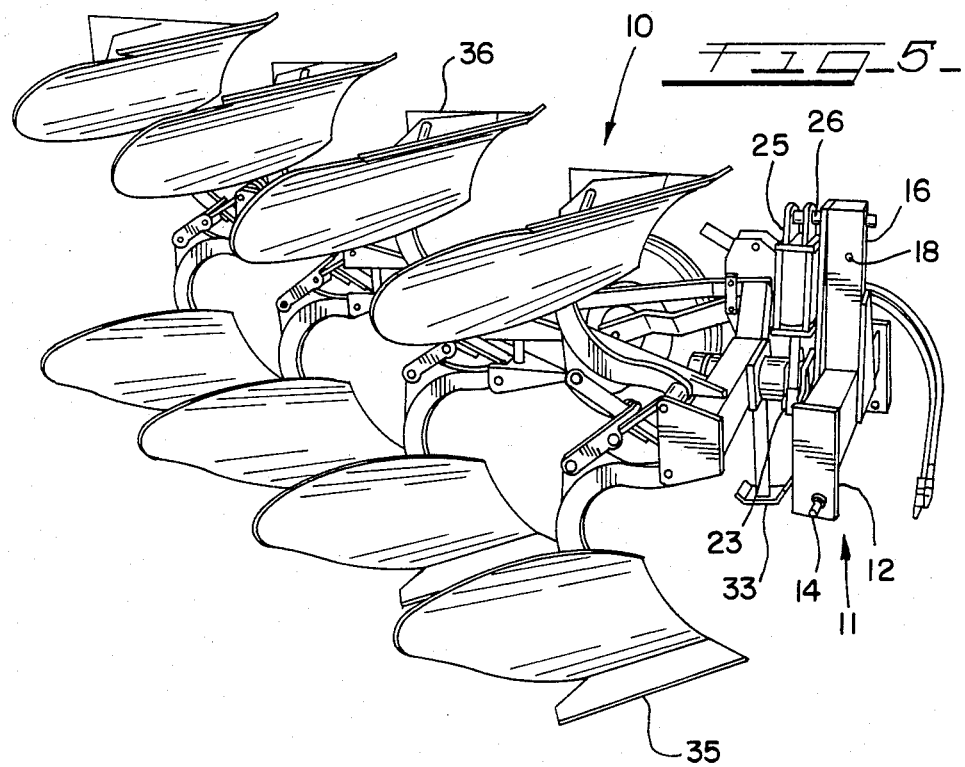
FIG_5_
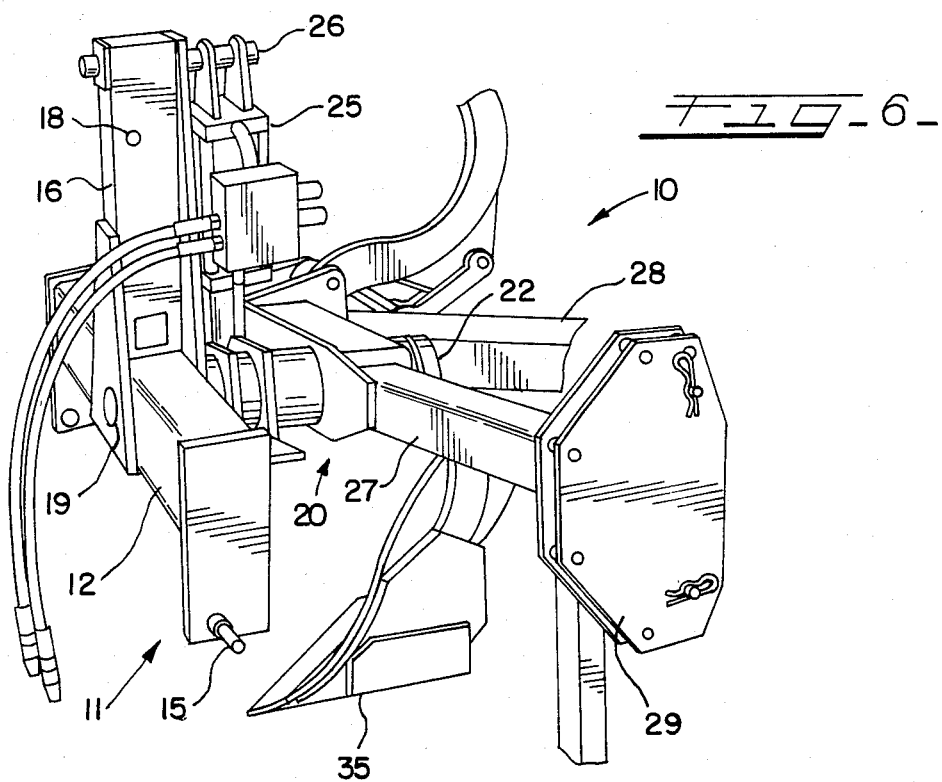
FIG_6_

TWO-WAY PLOW WITH OFFSET TRIPS

BACKGROUND OF THE INVENTION

1. Field of the Invention

This invention pertains generally to agricultural implements and more particularly to a two-way plow with offset and individual mechanical plow trips.

2. Description of the Prior Art

Individual trip mechanisms are usually provided for the working units of one-way plows to prevent damage when obstacles or the like are encountered. Where two-way, or roll over plows are utilized, the non-working plow units are usually mounted above the similarly spaced working units and spaced 180° therefrom and located in the same vertical plane. This leads to interference when the working plow unit is tripped and moves toward the non-tripped and non-working plow. This may be avoided by special linkage between the working and non-working plows as shown in U.S. Pat. No. 3,517,748 to Raymond C. Fischer dated June 30, 1970 and entitled Two-Way Plow Trip and assigned to subject Assignee.

This design requires considerable space for the tripping process and considerable extra elements besides long extension springs or the re-setting process. Other designs may utilize a single hydraulic cylinder per pair of right and left hand plows which is expensive and also requires considerable maintenance. This type plow is shown in U.S. Pat. No. 3,682,840 dated May 16, 1972 to Clarence B. Richey and entitled Two-Way Plow With Hydraulic Trip And Reset.

SUMMARY OF THE INVENTION

Applicants, with a view to eliminating the expensive hydraulic arrangement and the disadvantages of the mechanical design have designed a two-way plow that utilizes mechanical trips that are identical for right hand and left hand plow use and operable individually. To provide the needed clearance for the working plow to trip without affecting the non-working plow, the plows and therefore trips, are offset to avoid interference. Preferably, the trip arrangement includes a single pair of toggle links that reset when the plow system is lifted. No heavy spring arrangements are needed for reset and the plow and its trip are located in a compact package.

A need with two-way or roll over plows is the requirement to position the right hand plow that is adjacent the plow frame and thus tractor when working, a particular distance from the longitudinal center line of the tractor. This same distance can also be relative to the plow frame where same is connected to the tractor and its longitudinal center line is also aligned with the longitudinal center line of the tractor. Thus, the operator can then relate the right tractor-wheel or the like to the furrow and the nearest right hand plow and the equally spaced succeeding plows will then plow the new expanse without leaving ridges between the previously plowed ground. Upon the return of the tractor in the other direction, the plow system is rotated and the left hand plows are now working. Here the left hand plow nearest the frame must also be the same distance from the tractor longitudinal center line as the right hand plow was, and the left tractor wheel or the like can be then positioned to plow the unplowed ground without leaving ridges. Of course, on the return, the equally spaced left hand plows turn the soil in the same direction as the right hand plows for a smooth field. This arrangement is useful in plowing terraced fields.

Due to the offset trips, the roll or pivot axis of the plow system cannot be on the longitudinal center line of the tractor or plow frame as when the right hand and left hand plows are in the same plane. The offset roll axis location from the longitudinal center line varies with the placement of the right hand and left hand plows to each other. The line of draft of the plow system which depends on the number of plow bottoms varies with the right hand and left hand plows, but is symmetric about the tractor center line.

Due to the preferably, uncomplicated plow trips, structure must be provided that prevents tripping of the non-working plows and thus the lowering of same which will still allow same to trip in the working position. Applicants provide for this by structure that restrains movement over enter of the toggle links.

It is, therefore, an object of this invention to provide a new and improved two-way plow.

Another object of this invention is to provide a two-way plow with offset trips wherein the distance of the right hand plow nearest the tractor in the working position to the center line of the frame is the same distance as that of the left hand plow nearest the tractor in the working position.

BRIEF DESCRIPTION OF THE DRAWINGS

FIG. 5 is a perspective right side view of primarily the plow rollover structure; and FIG. 6 is perspective left side view of a portion of the plow.

DESCRIPTION OF THE PREFERRED EMBODIMENT

Figure 1:
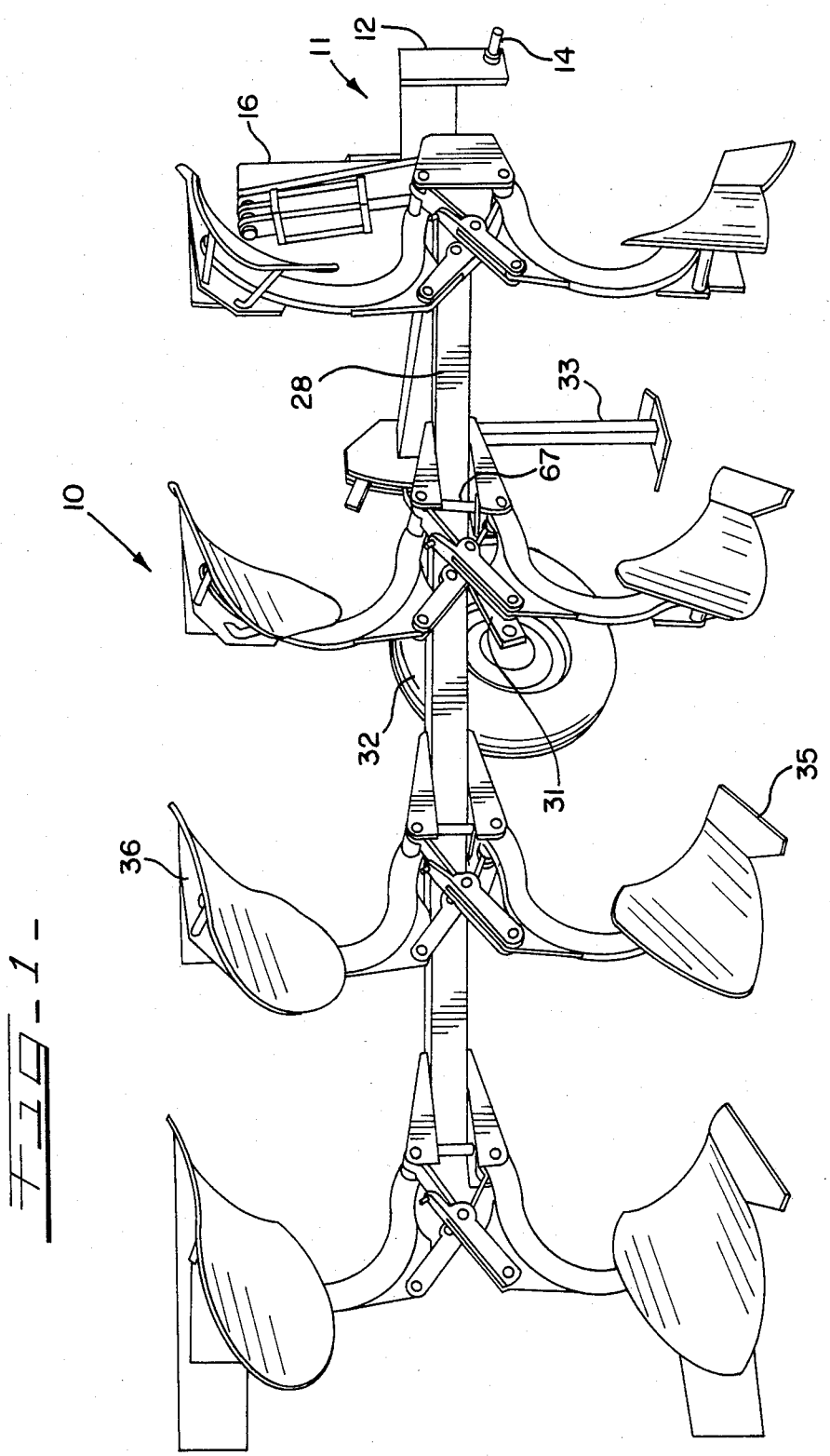
FIG. 1 is a right side view of the plow of this invention with the right hand plows shown in the lowered working positions.

Referring to FIGS. 1, 2, 3, 5 and 6, 10 indicates the plow of this invention. Plow 10 includes frame 11 which is adapted to be connected to a tractor by a three point hitch arrangement. Frame 11 includes transverse beam 12 having laterally extending members 14 and 15 for connection to the lower arms of the tractor 15a. It is to be noted that the longitudinal center line 15b of the tractor 15a is the same as that of frame 11 and thus beam 12. Vertical extending mast 16 rigidly connected to beam 12 has opening 18 for the upper arm of the tractor three point hitch. Rigidly mounted in beam 12 and extending rearwardly therefrom is shaft 19. Rotatably mounted on shaft 19 is housing 20. Collar 22 fixed to shaft 19 maintains housing 20 on shaft 19. Housing or support structure 20 has ears 23 extending therefrom and located adjacent beam 12. A hydraulic cylinder 25 having the base end pivotally mounted on pin 26 extending from mast 16 has its rod ends pivotally connected to ears 23. As shown the rod is extended with the right hand plows in the working position. When the rod is retracted and again extended the entire plow is rotated 180° to place the left hand plows in the working position.

Also a part of housing 20 and rigidly attached thereto for movement therewith is inclined beam 28. The front end of inclined beam 28 as shown in FIG. 1 and in FIG. 6, joins generally transverse portion 27 of housing 20 on the right side of plow 10 and extends rearwardly in a conventional fashion. Transverse portion 27 also extends to the left side of plow 10 and has bracket 29 with a plurality of holes for adjustably mounting arm 31 for gauge wheel 32. Stand 33 attached to bracket 29, supports plow 10 when same is removed from the tractor. It is to be noted that wheel 32 is also utilized with the left hand plows. Supported from inclined beam 28 at equally spaced intervals are right hand plows 35, of which four are shown in the working position in FIG. 1. Four left hand plows 36 are likewise also supported on beam 28 but located generally above the right hand plows 35 and thus are in the non-working position in FIG. 1.

Figure 2:
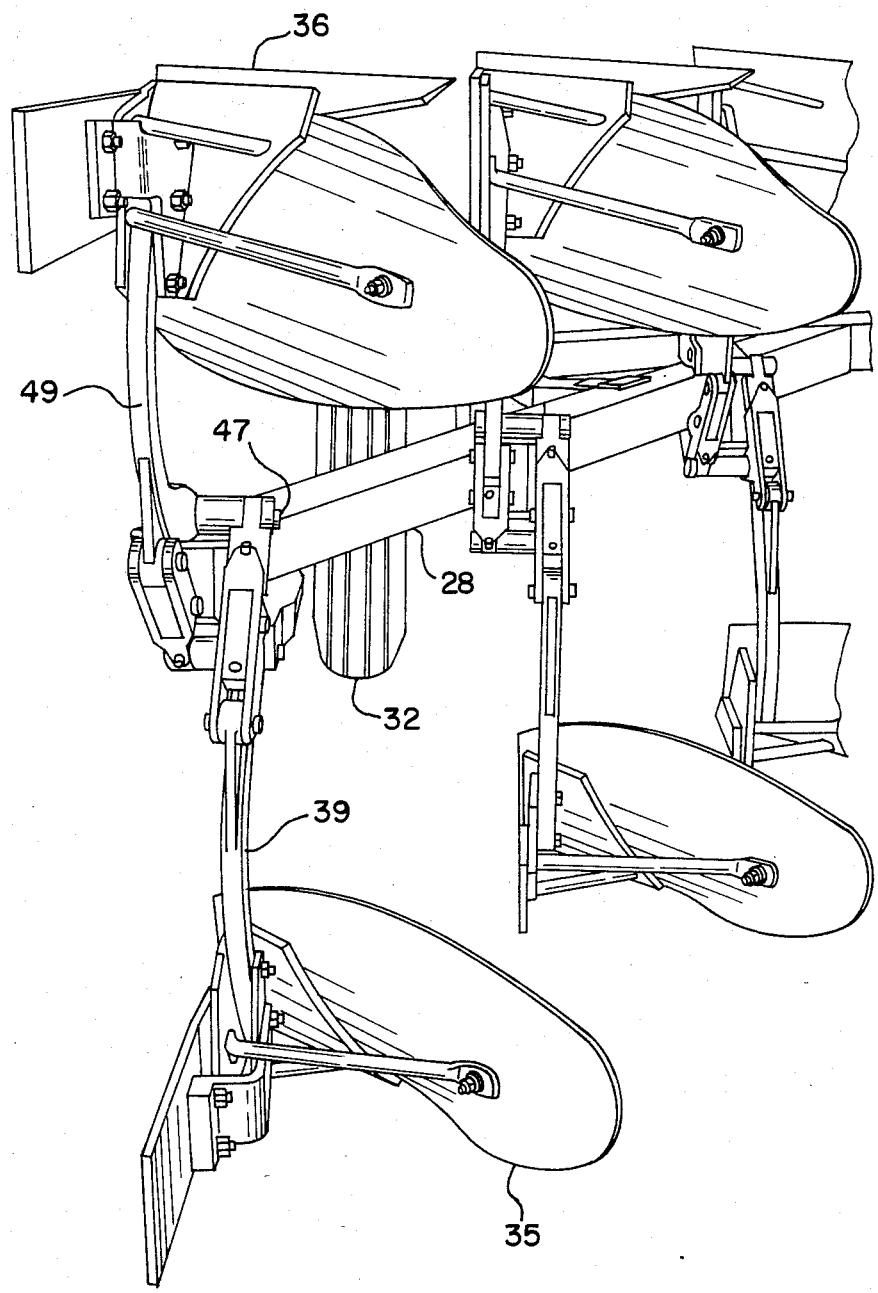
FIG. 2 is a rear view of the rear portion of the plow.
Figure 4:
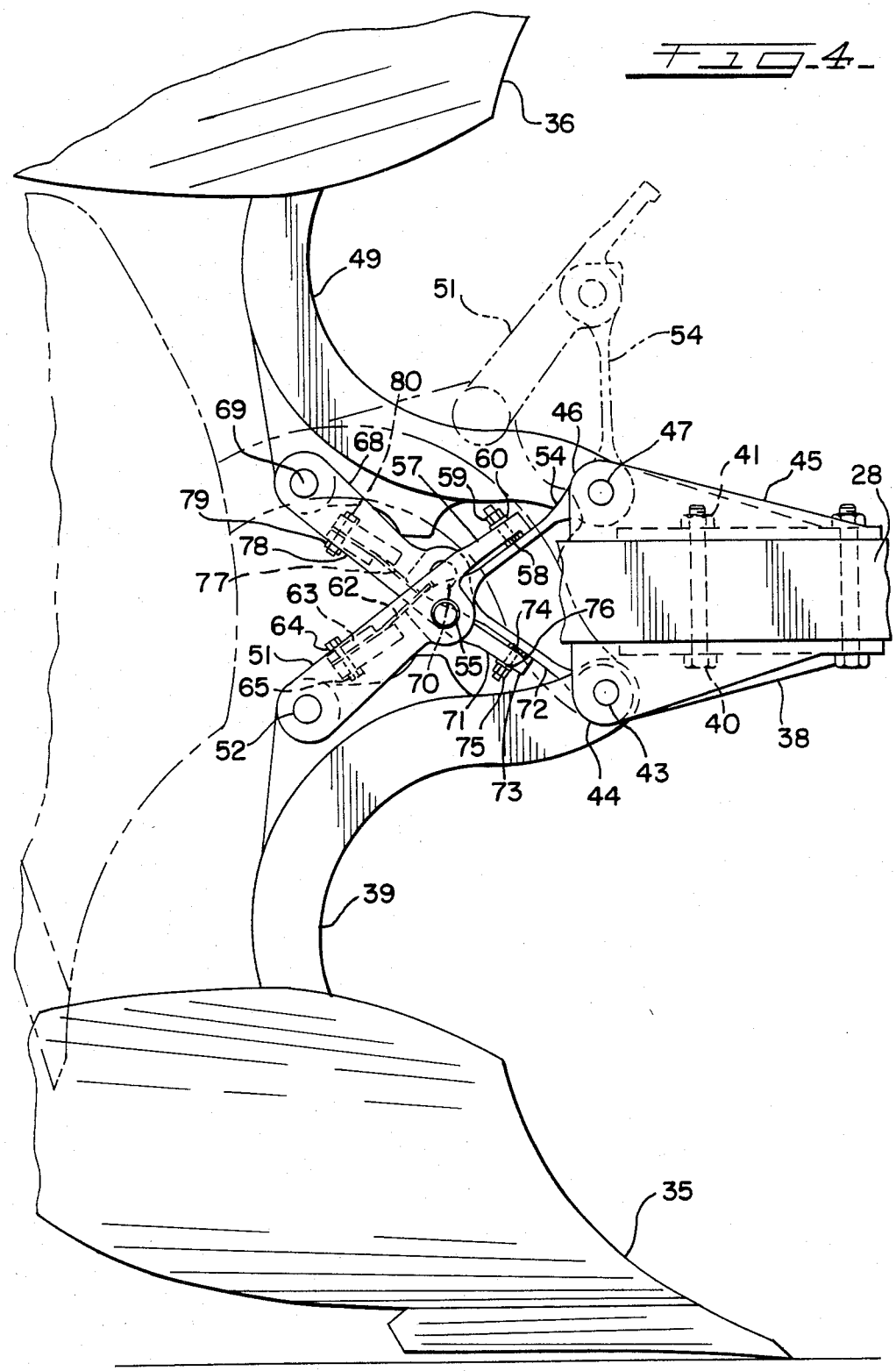
FIG. 4 is an enlarged side view (similar to FIG. 1) of the rearmost individual right and left hand plows and the trip linkages therefor.

Referring to FIGS. 2 and 4, the mounting of the right hand plows 35 and left hand plows 36 is shown in detail. It is to be noted that the mounting arrangement shown in FIG. 4 is identical for all of the plows and thus only they will be described although the view of FIG. 2 will be used to clarify same. Lower bracket 38 connects the right hand standard 39 of right hand plow 35 to the bottom of inclined beam 28 by bolts 40 and nuts 41 extending through the bracket and beam. Standard 39 is pivotally mounted on pin 43 extending through openings in clevis 44 of bracket 38 below inclined beam 28. Upper bracket 45 which is identical to bracket 38 but renumbered for clarity is mounted in a reversed position on top of beam 28 and is held thereto by the same bolts 40 and nuts 41 of bracket 38. Upper bracket 45 also has a clevis 46 having openings therethrough for pin 47 which pivotally mounts thereto standard 49 for left hand plow 36. Clevis 46, as shown, is located above beam 28 in FIG. 4. A toggle link assembly extending between each standard and either pin 43 and 47 provides protection for each plow, allowing same to trip upon the plow encountering an obstacle.

As shown in FIG. 4, rear unitary toggle link 51 for right hand plow 35 is pivotally connected to pin 52 extending through standard 39 and is also pivotally connected to the rear end of front toggle link 54 which is flat and acts as a spring by toggle link pin 55. The front end of front toggle link 54 is pivotally connected to pin 47 of upper bracket 45. Rear toggle link 51 has a front extension 57 that extends over front toggle link 54. Bolt 58, nut 49 and a plurality of washers 60 by juxtaposition of the washers allows adjusting of the toggle link pin 55 to adjust the tripping load of the toggle. Also, mounted on rear toggle link 51 is leaf spring 62 and bar 63 which are fastened thereto by bolt 64 extending therethrough and nut 65. Spring 62 extends over the rear end of front link 54 where pin 55 extends therethrough. Spring 62, when the right plow is rotated to the non-working position, tends to prevent the toggle linkage from breaking and the plow from dropping. However, as shown in FIG. 4, if plow 35 encounters an obstacle when working, plow 35 and its linkage can still strip against the action of spring 62. The broken line position of rear toggle link 51 and front toggle link 54 shows same when the linkage is tripped. To reset the linkage, the plow must be raised by the tractor. Pin 67 (See FIG. 1) extending between bracket 38 and bracket 45 but not beam 28 may also be provided to make more rigid the connection of the brackets to the beam 28.

The toggle linkage for standard 49 of left hand plow 36 is similar to that for standard 39 and uses the same elements. Of course, as shown in FIG. 4 it is rotated 180° from the right hand standard to the non-working position. Specifically, pin 47 also pivotally supports standard 49 above beam 28. This is shown best in FIG. 2. Rear toggle link 68 (See FIG. 4) is pivotally connected to standard 49 by pin 69. At the front end of rear toggle link 69, toggle link pin 70 connects same to the rear end of front toggle link 72. The front end of toggle link 72 (also a spring type link) is pivotally mounted on the other end of pin 43 of standard 35. Rear toggle link 68 also has an extension 73 that extends over the front toggle link 72 and bolt 74, nut 75 and washers 76 provide adjustment for toggle link pin 70 similar to that provided for standard 39. Needed with standard 49 in the non-working position is leaf spring 77, bar 78 and bolt 79 and nut 80. Spring 77 in contact with the front end of front toggle link 72 prevents toggle link breakage in the non-working position.

Figure 3:
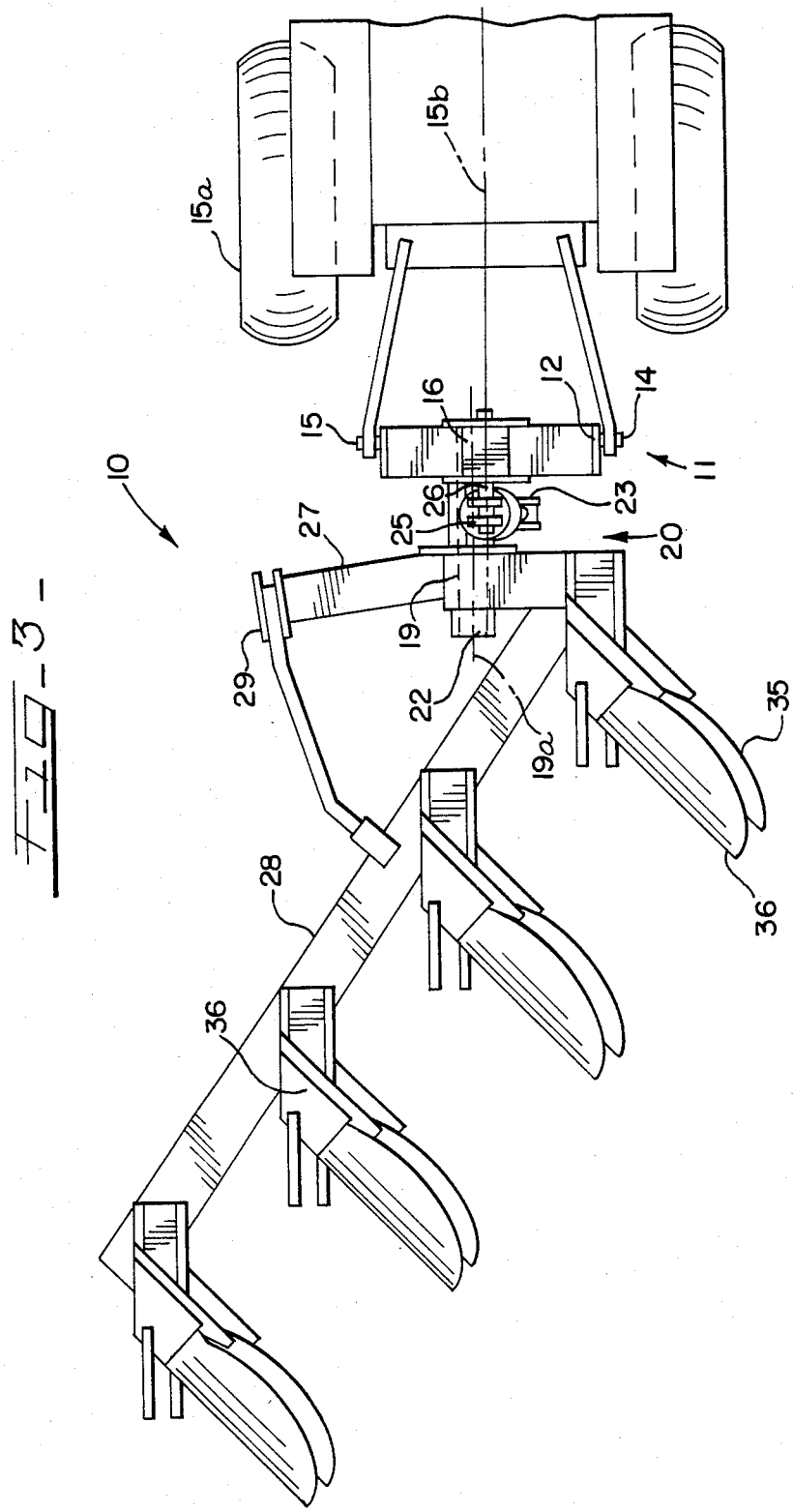
FIG. 3 is a schematic plan view of the plow.

FIG. 2 shows the rather narrow offset of the trip linkages for the right hand and left hand plows. This offset which is sufficient for trip clearance (96 mm between the center lines of the trips) has to be taken into consideration in the plow roll over process to determine the actual pivot axis if the same distance of the foremost right hand working plow to the longitudinal center line of the tractor (or frame) is to be maintained for also the foremost left hand working plow. The location of this pivot (the center line of shaft 19 or 19a) to either lateral side of the tractor center line 15b is dependent upon which type plow is closest to the tractor center line. As shown in FIGS. 2 and 3, the right hand plow is a greater distance laterally from the tractor center line then the left hand plow. Thus, and most simply, by making a layout to scale and denominating "X" as the dimension to the preferably foremost right hand plow in the working position from the tractor center line and locating the associated left hand plow laterally inward by 96 mm. (which is the same dimension as between the centerlines of the trips 9 as is apparent from FIG. 2) this locates essentially one half of the circle. By now measuring "X" from the center line of the tractor laterally in the other direction provides the position of the foremost left hand plow in the working position and by also spacing by 96 mm outwardly therefrom the right hand plow (which will occupy this position when rotated) the diameter of the circle of rotation of the right hand plow is provided. This diameter will equal 2X+96 and the radius therefore will be X+48. Inasmuch as X is the distance from the center line of the tractor to the foremost left hand plow and 96 mm the distance therefrom to the outer right hand plow for a total of X+96, subtracting therefrom the X+48 leaves 48 mm as the distance from the tractor centerline 15b to the new pivot axis 19a which is toward the left hand plow in the working position. The 48 mm is ½ of the offset of 96 mm and will always be ½ of any offset utilized. The location, however, would be on the other side of the tractor center line for a laterally closer right hand plow in the working position than left hand plow. A check of the above layout, if developed, would show that about the pivot (center line 19a) the right hand plow rotated is X−48 from the pivot and X+48 from the pivot to the working position. The left hand plow is X−48 in the working position about the pivot 19a and X−96+48=X−48 in the non-working position.

It is believed that in view of the foregoing remarks the operation of the plow is clearly apparent. Also apparent is that the design provides a plow with offset trips that utilizes common pivots and elements and has a varied pivot axis that allows maintaining the foremost right hand plow in the working position the same distance from the tractor and therefore frame center line as the foremost left hand plow for efficient plowing.

What is claimed is:

1. A two-way plow adapted to be connected to a mobile power source, said two-way plow comprising:
   (a) a frame, said frame being adapted to be connected to the mobile power source for towing, said frame having a longitudinal center line;
   (b) a support structure mounted for rotation on said frame, said support structure including a beam having an end located generally adjacent the right side of said frame and extending diagonally rearwardly so that the other end is generally directly rearward of said left side of said frame in one position of rotation;
   (c) a plurality of equally spaced right hand plows mounted from said beam by support means for working the soil in one direction in said one position of rotation of said structure, and a plurality of equally spaced left hand plows mounted from said beam by support means upwardly of said right hand plows for working said soil in another direction upon rotation of said structure to another position;
   (d) said support means each including trip linkages with the trip linkage of said right hand plow being offset from the trip linkage for said left hand plow to provide clearance for the tripping action between the plows;
   (e) means for rotating said support structure from a rotational axis laterally fixed with respect to said frame at all times, the axis of rotation of said support structure on said frame being offset from the longitudinal center line of said frame, said offset of the axis of rotation being a predetermined amount of the offset between the trip linkages of said right and left hand plows such that, the right hand plow adjacent said frame is located the same distance from the longitudinal center line of said frame when working, as the left hand plow adjacent the frame is located with respect to the longitudinal center line of said frame when working; and
   (f) means to prevent tripping action of the non-working plows.

2. The plow of claim 1 in which the offset of the axis of rotation is one half of the amount of the offset between the trip linkages between said right hand and left hand plows.

3. The plow of claim 2 in which the right hand plow adjacent said frame when working is farther from said frame than the left hand plow when non-working, and the offset of the axis of rotation from the longitudinal center line of said frame is toward the left side of said frame.

4. The plow of claim 3 in which said support means includes bracket structure fastened to said beam, said right hand plow being pivotally mounted on said bracket and said trip linkage includes an upper spring link pivotally connected at its upper end to said bracket and at its lower end to a rigid lower link, said lower link also being pivotally connected to said right hand plow, said lower link having an extension in contact with said spring link which upon bowing of same, breaks the linkage for upward movement of said right hand plow, and said trip linkage for said left hand plow being generally the same as said trip linkage for said right hand plow but inverted therefrom, whereby one of said right and left hand plows is non-working and in which said means to prevent tripping of the non-working plow is a leaf spring attached to said rigid link of the non-working plow and in contact with the pivotable connection between said rigid and spring link of the non-working plow to bias the same to a non-trip position, and said right hand plow upper spring link having a pivotal axis of rotation with said bracket coaxial with said left hand plow axis of rotation and said left hand plow upper spring link having a pivotal axis of rotation with said bracket coaxial with said right hand plow axis of rotation.

* * * * *